US009250433B2

(12) United States Patent
Makara et al.

(10) Patent No.: US 9,250,433 B2
(45) Date of Patent: Feb. 2, 2016

(54) MICROSCOPE SYSTEM WITH PLURAL ATTACHABLE/DETACHABLE OBJECTIVE LENS UNITS

(75) Inventors: Yasunori Makara, Tokyo (JP); Miwa Fukunaga, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 660 days.

(21) Appl. No.: 13/549,644

(22) Filed: Jul. 16, 2012

(65) Prior Publication Data
US 2013/0021663 A1   Jan. 24, 2013

(30) Foreign Application Priority Data
Jul. 20, 2011 (JP) .................. 2011-159301

(51) Int. Cl.
G02B 21/02 (2006.01)
G02B 21/06 (2006.01)
G02B 21/24 (2006.01)

(52) U.S. Cl.
CPC .................. G02B 21/248 (2013.01)

(58) Field of Classification Search
CPC ........ G02B 21/00; G02B 21/02; G02B 21/06; G02B 21/24; G02B 21/248; G02B 13/00; G02B 15/00–15/08
See application file for complete search history.

(56) References Cited

U.S. PATENT DOCUMENTS

| 5,337,177 | A | | 8/1994 | Toyoda et al. | |
|---|---|---|---|---|---|
| 6,128,128 | A | * | 10/2000 | Otaki et al. | 359/381 |
| 6,268,958 | B1 | * | 7/2001 | Furuhashi | 359/381 |
| RE37,445 | E | * | 11/2001 | Schalz | 359/368 |
| 6,359,731 | B1 | * | 3/2002 | Koyama | 359/381 |
| 6,437,911 | B1 | * | 8/2002 | Hasegawa | 359/381 |
| 8,493,656 | B2 | * | 7/2013 | Seifert | 359/381 |
| 8,553,323 | B2 | * | 10/2013 | Gilbert et al. | 359/381 |
| 2001/0008461 | A1 | * | 7/2001 | Koyama et al. | 359/380 |
| 2008/0204865 | A1 | * | 8/2008 | Yoneyama et al. | 359/381 |
| 2010/0321678 | A1 | * | 12/2010 | Koh et al. | 356/237.5 |

FOREIGN PATENT DOCUMENTS

| JP | 03100509 A | 4/1991 |
|---|---|---|
| JP | 10339845 A | 12/1998 |
| JP | 3900664 B2 | 1/2007 |

OTHER PUBLICATIONS

Japanese Office Action dated Mar. 3, 2015, issued in counterpart Japanese Application No. 2011-159301.

* cited by examiner

*Primary Examiner* — Derek S Chapel
(74) *Attorney, Agent, or Firm* — Holtz, Holtz & Volek PC

(57) ABSTRACT

A plurality of mounting devices are selectively exchanged while keeping the same parfocal distances for objective lenses among these mounting devices. A microscope system includes a microscope main unit and a plurality of attachable/detachable objective lens units that are selectively attached to the microscope main unit. The microscope main unit includes raising mechanism that can move the attached objective lens unit in an optical axis direction. The plurality of objective lens units have a revolver or a nosepiece that can be attached to the microscope main unit and an objective lens that can be mounted on the revolver or the nosepieces in an attachable/detachable manner. Distances from an attachment position in the microscope main unit for the revolver or the nosepiece to focal positions of the objective lenses are set to be mutually equal among the objective lens units.

4 Claims, 5 Drawing Sheets

MICROSCOPE SYSTEM WITH PLURAL ATTACHABLE/DETACHABLE OBJECTIVE LENS UNITS

This application is based on Japanese Patent Application No. 2011-159301, the contents of which are incorporated herein by reference.

TECHNICAL FIELD

The present invention relates to a microscope system.

BACKGROUND ART

In the related art, there is a microscope device that has a mounting device that is provided with a plurality of objective lenses in an attachable/detachable manner and that can selectively place these objective lenses in an observation optical path of the microscope (for example, see Patent Literature 1). The microscope device disclosed in Patent Literature 1 is provided with a mounting device that has a first holding member that holds a first objective lens; a second holding member that holds a second objective lens having a shorter working distance than the first objective lens; a raising mechanism that moves the second objective lens in an optical axis direction; and an adjusting mechanism that adjusts the position of the second objective lens in the optical axis direction moved by the raising mechanism.

With this microscope device disclosed in Patent Literature 1, a state in which the first objective lens having a longer working distance is placed in the observation optical path of the microscope is used as a reference, and the first objective lens is switched to the second objective lens while maintaining parfocal distances therefor by moving the second objective lens in the optical axis direction with the raising mechanism and by adjusting the position to which the second objective lens is moved with the adjusting mechanism.

CITATION LIST

Patent Literature

{PTL 1} Publication of Japanese Patent No. 3900664

SUMMARY OF INVENTION

Technical Problem

However, in the case in which multiple types of objective lenses with different parfocal distances are used by switching them, the whole mounting device is exchanged in some cases. In such a case, the mounting device is exchanged with another mounting device in a state in which it is temporarily withdrawn from a specimen on a stage in the optical axis direction in order to ensure enough space; however, because the withdrawal distance in the optical axis direction differs for each mounting device, there is a problem in that, even if the new mounting device, after exchange, is moved back by the same distance by which the mounting device before exchange is withdrawn, the image may be out of focus or the objective lens may end up coming into contact with the specimen.

The present invention has been conceived in light of the above-described circumstances, and an object thereof is to provide a microscope system in which a plurality of mounting devices can be employed by selectively exchanging them while maintaining parfocal distances for objective lenses among the plurality of mounting devices.

Solution to Problem

In order to achieve the above-described object, the present invention employs the following solutions.

An aspect of the present invention is a microscope system including a microscope main unit that generates illumination light to be radiated onto a specimen and that detects detection light from the specimen; and a plurality of attachable/detachable objective lens units that are selectively attached to the microscope main unit, the microscope main unit including a raising mechanism that can move the attached objective lens unit in an optical axis direction; wherein the plurality of objective lens units have a mounting device that can be attached to the raising mechanism and an objective lens that is mounted on the mounting device in an attachable/detachable manner, and that collects the detection light from the specimen; and distances from a mounting position in the microscope main unit for the mounting device to focal positions of the objective lenses are set to be mutually equal among these objective lens units.

With this aspect, the plurality of objective lens units are employed by being selectively attached to the microscope main unit, and the microscope main unit detects the detection light from the specimen through the objective lens of one objective lens unit attached thereto.

In this case, by setting the distances from the mounting position in the microscope main unit for the mounting device to the focal positions of the objective lenses to be mutually equal among the objective lens units, even if the objective lens unit is moved in the optical axis direction with the raising mechanism in order to ensure sufficient space when exchanging the objective lens unit, the distance from the mounting position in the mounting device of the objective lens unit for the objective lens to the focal position of the objective lens (the distance from the mounting position in the mounting device for the objective lens to the focal position of the objective lens will be hereinafter referred to as "parfocal distance") before exchange and the parfocal distance for the objective lens unit after exchange can be maintained in a simple manner. Therefore, the plurality of objective lens units can be employed by selectively exchanging them while maintaining the parfocal distances for the objective lenses among the plurality of the objective lens units.

In the above-described aspect, the mounting device of one of the objective lens units may have a mounting device main unit to which the objective lens is mounted and a mounting adaptor that is fixed to the mounting device main unit and that attaches the mounting device main unit to the microscope main unit in an attachable/detachable manner.

With such a configuration, even if the size of the mounting device main unit of one of the objective lens units is smaller than the sizes of mounting devices of the other objective lens units formed as a single piece, the size difference is compensated for with the mounting adaptor, and the distances from the attachment positions where the mounting devices are attached to the microscope main unit to the focal positions of the objective lenses can be mutually matched among these objective lens units.

In the above-described aspect, the objective lens unit includes a first objective lens and a second objective lens, wherein a distance in the optical axis direction from an end on a mounting device side of the first objective lens to a focal position of the first objective lens is set to be shorter than a distance in the optical axis direction from an end on a mounting device side of the second objective lens to a focal position of the second objective lens; and a distance in the optical axis direction from a mounting position for the first objective lens in the mounting device to the focal position of the first objective lens is set to be equal to a distance in the optical axis direction from the mounting position for the second objective lens in the mounting device to the focal position of the second objective lens.

In the above-described aspect, an objective lens adaptor interposed between the second objective lens and the mounting device.

Advantageous Effects of Invention

The present invention affords an advantage in that a plurality of mounting devices can be employed by selectively exchanging them while maintaining parfocal distances for objective lenses among the plurality of mounting devices.

DESCRIPTION OF EMBODIMENT

A microscope system according to an embodiment of the present invention will be described below with reference to the drawings.

Figure 1:
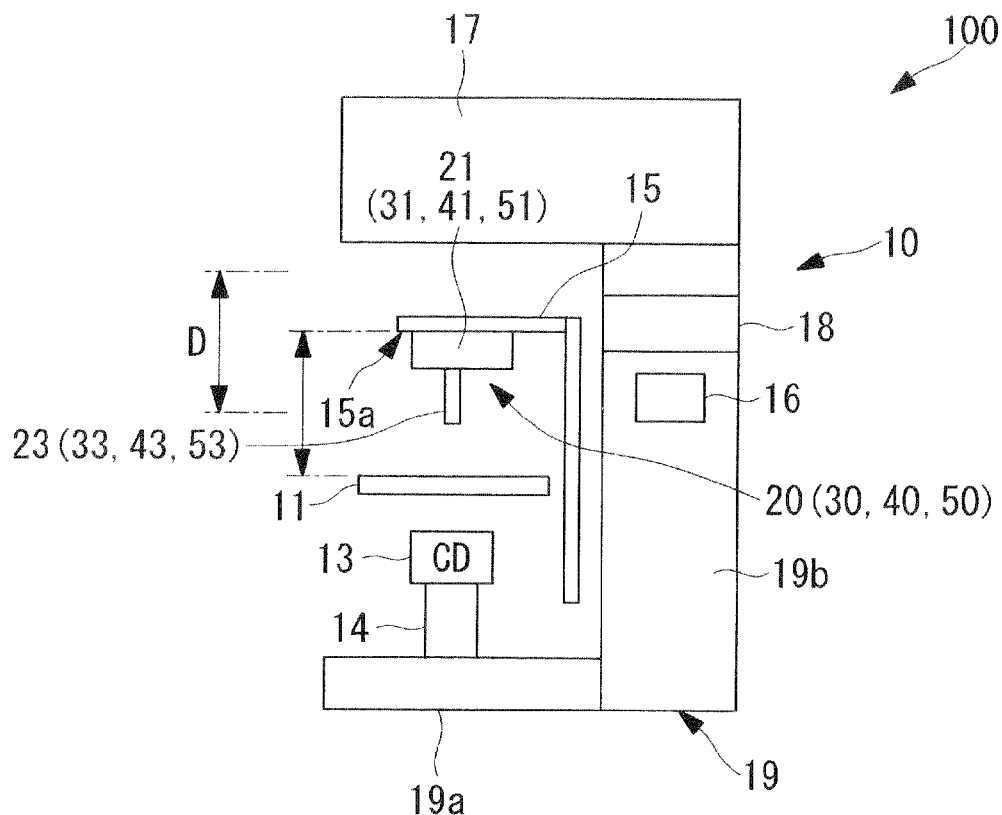
FIG. 1 is a schematic configuration diagram showing a microscope system according to an embodiment of the present invention.

As shown in FIG. 1, a microscope system 100 according to this embodiment is provided with, for example, a microscope main unit 10 and a plurality of attachable/detachable objective lens units 20, 30, 40, and 50 that are selectively attached to the microscope main unit 10.

The microscope main unit 10 is provided with a stage 11 on which a specimen (not shown) is placed; a light source (not shown) that emits illumination light for incident-light illumination; a condenser 13 that irradiates the specimen with illumination light emitted from a light source (not shown) for transmission illumination; an arm 15 to which the objective lens unit 20, 30, 40, or 50 is selectively attached; a illuminator 17 that has an illumination optical system (not shown) inside thereof; a frame 19 that supports the condenser 13, the arm 15, and the illuminator 17; and a detection unit (not shown) that detects detection light returning from the specimen irradiated with the illumination light.

This microscope main unit 10 is an upright microscope with a fixed stage where focusing is performed by moving the objective lens unit 20, 30, 40, or 50 up and down with respect to the stage 11. The microscope main unit 10 is provided with, for example, an electrically powered raising mechanism 16 with which the attached objective lens unit 20, 30, 40, or 50 can be moved in an optical axis direction.

The frame 19 is formed in a L-shape with a base portion 19a in the horizontal direction and a body portion 19b formed perpendicular to the base portion 19a.

The stage 11 is supported by a stage-supporting post (not shown) and is placed above the base portion 19a of the frame 19 so that it can be set at a predetermined height. In addition, the stage 11 is provided so that it can be moved in the horizontal directions (XY-axial directions) perpendicular to the height direction (Z-axial direction) in the state in which it is supported by the stage-supporting post.

The condenser 13 is supported by a condenser holder 14 that is provided in an attachable/detachable manner on the base portion 19a of the frame 19 so as to be placed facing the objective lens unit 20, 30, 40, or 50 with the stage 11 interposed therebetween. This condenser 13 is provided for the condenser holder 14 in an attachable/detachable manner so that it can be directly installed on the base portion 19a of the frame 19.

The arm 15 is provided in an attachable/detachable manner at a stage-11-side wall surface of the body portion 19b of the frame 19 and is provided so that it can be moved up and down along the stage-11-side wall surface with the raising mechanism 16. In FIG. 1, reference sign D indicates the stroke of the arm 15.

This arm 15 holds the objective lens unit 20, 30, 40 or 50 in an attachable/detachable manner so that the objective lens unit 20, 30, 40, or 50 is placed above the stage 11. In FIG. 1, reference sign 15a indicates an attachment position in the arm 15 for the objective lens unit 20, 30, 40, or 50.

The illuminator 17 is provided at the top end of the body portion 19b of the frame 19 and is placed so as to protrude above the stage 11. A height-increasing member 18 having a predetermined thickness is provided in an attachable/detachable manner between the illuminator 17 and the top end of the body portion 19b of the frame 19. By attaching/detaching the height-increasing member 18, a reference position of the arm 15 and the height of the illuminator 17 can be adjusted.

Figure 2:
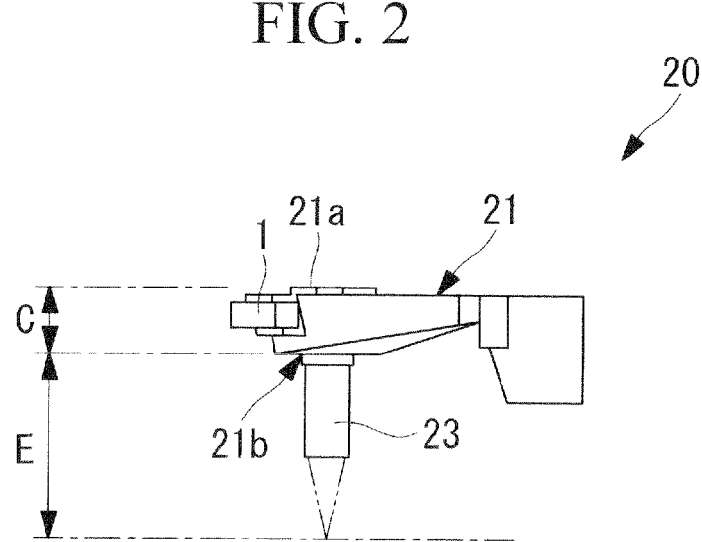
FIG. 2 is a schematic configuration diagram showing an imaging objective lens unit.
Figure 3:
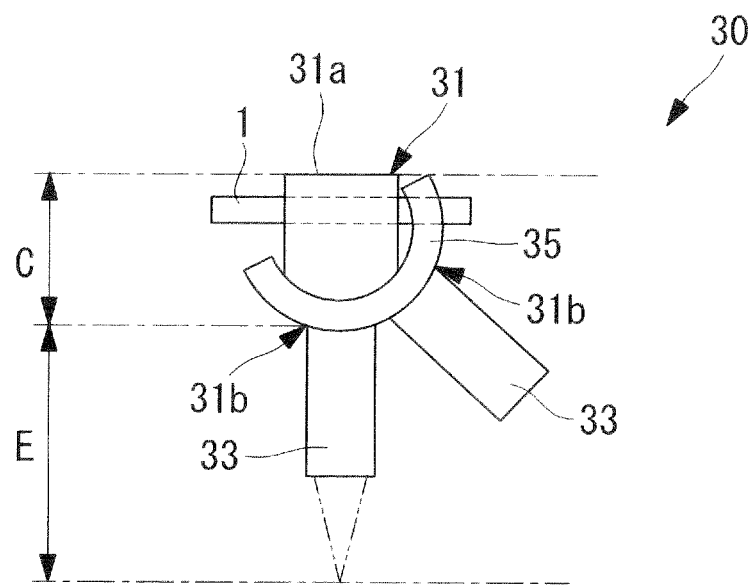
FIG. 3 is a schematic configuration diagram showing a patch-clamping or in-vivo objective lens unit.
Figure 4:
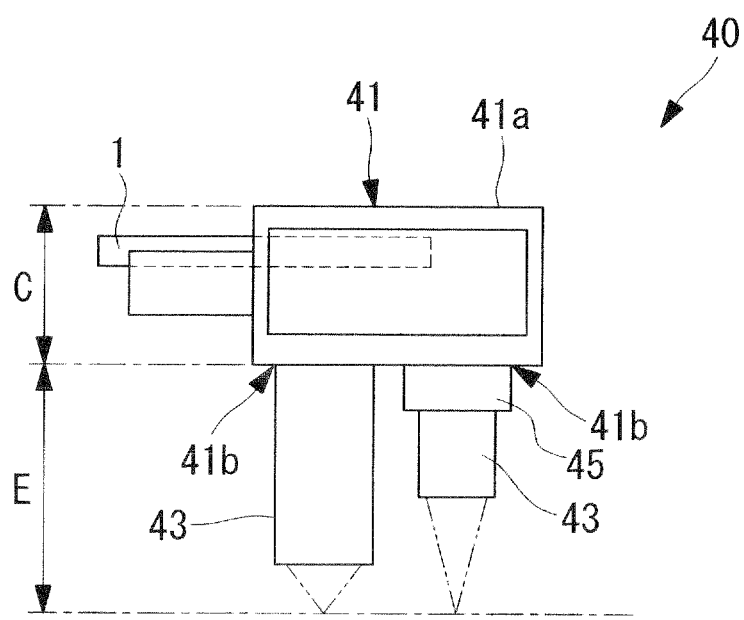
FIG. 4 is a schematic configuration diagram showing another patch-clamping or in-vivo objective lens unit.
Figure 5:
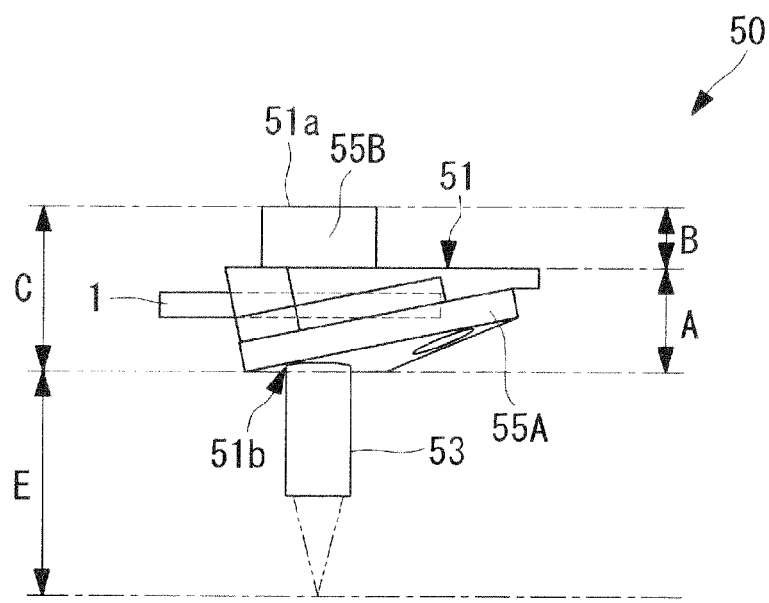
FIG. 5 is a schematic configuration diagram showing another patch-clamping or in-vivo objective lens unit.

The objective lens units 20, 30, 40, and 50 may be, for example, an imaging objective lens unit 20, such as one shown in FIG. 2, objective lens units 30, 40, and 50 and so on for patch-clamping or for observing a live organism (in vivo), such as those shown in FIGS. 3, 4, and 5.

As shown in FIG. 2, the imaging objective lens unit 20 is formed of a revolver (mounting device) 21 which can be attached to the arm 15 of the microscope main unit 10 and an objective lens 23 that can be attached to and detached from the revolver 21.

The revolver 21 can be moved in the optical axis direction (Z-axial direction) of the objective lens 23 through the up-down motion of the arm 15. In addition, the revolver 21 can be rotated about a predetermined rotation axis (not shown), and a plurality of objective lenses 23 can be simultaneously mounted thereon in the circumferential direction with spaces therebetween. In FIG. 2, one objective lens 23 is mounted on the revolver 21. This revolver 21 is configured such that, by rotating it about the rotation axis, any one of the plurality of objective lenses 23 can selectively be placed at a position facing the specimen.

In addition, the distances from an attachment position (mounting position) 21a where the revolver 21 is attached to the arm 15 to mounting positions 21b where the objective lenses 23 are mounted on the revolver 21 are set to be dimension C. Respective lengths of the plurality of objective lenses 23 mounted on the revolver 21 are set so that distances in the optical axis direction from mounting positions 21b in the revolver 21 for the individual objective lenses 23 to focal positions of the individual objective lenses 23 (the distances in the optical axis direction from the mounting positions 21b in the revolver 21 for the objective lenses 23 to the focal positions of the objective lenses 23 will be, hereinafter, referred to as "parfocal distances") are dimension E.

In addition, the revolver 21 is compatible with differential interference contrast (DIC) observation, and is provided with a DIC slider 1 in an attachable/detachable manner, which serves as a differential-interference-contrast prism unit employed in the differential interference contrast observation. The DIC slider 1 is horizontally mounted on the revolver 21 so that a DIC prism (not shown) provided in the DIC slider 1 as a differential-interference-contrast prism is placed near a pupil position of the objective lens 23.

The patch-clamping or in-vivo objective lens units 30, 40, and 50 are as follows.

As shown in FIG. 3, the objective lens unit 30 is formed of a nosepiece (mounting device) 31 that can be attached to the arm 15 of the microscope main unit 10 and an objective lens 33 that can be attached to and detached from the nosepiece 31.

The nosepiece 31 is provided with a swing unit 35 that can swing about a predetermined swing axis extending in the X or Y axial direction. A plurality of objective lenses 33 can be simultaneously mounted on the swing unit 35 with spaces therebetween in the swinging direction. In FIG. 3, two objective lenses 33 are mounted on the nosepiece 31. This nosepiece 31 is configured such that, by swinging the swing unit 35 about the swing axis, any one of the plurality of objective lenses 33 can be selectively placed in a position facing the specimen.

In addition, distances from an attachment position (mounting position) 31a where the nosepiece 31 is attached to the arm 15 to mounting positions 31b where the objective lenses 33 are mounted on the nosepiece 31 are set to be dimension C. Respective lengths of the plurality of objective lenses 33 mounted on the nosepiece 31 are set so that distances in the optical axis direction from the mounting positions 31b in the nosepiece 31 for the individual objective lenses 33 to focal positions of the individual objective lenses 33 (the distances in the optical axis direction from the mounting positions 31b in the nosepiece 31 for the objective lenses 33 to the focal positions of the objective lenses 33 will be, hereinafter, referred to as "parfocal distances") are dimension E.

Next, as shown in FIG. 4, the objective lens unit 40 is formed of a sliding nosepiece (mounting device) 41 that can be attached to the arm 15 of the microscope main unit 10 and an objective lens 43 that can be attached to and detached from the nosepiece 41. The nosepiece 41 can be slid in the X or Y axial direction and a plurality of objective lenses 43 can be simultaneously mounted thereon with spaces therebetween in the sliding direction. This nosepiece 41 is configured so that, by sliding it, any one of the plurality of objective lenses 43 can be alternatively placed in a position facing the specimen.

In addition, distances from an attachment position (mounting position) 41a where the nosepiece 41 is attached to the arm 15 to mounting positions 41b where the objective lenses 43 are mounted on the nosepiece 41 are set to be dimension C. In FIG. 4, two objective lenses 43 are mounted on the nosepiece 41. One of the objective lenses 43 is provided with an objective lens adaptor 45 placed between the objective lens 43 and the mounting position 41b in the nosepiece 41. For one of the objective lenses 43, the parfocal distance thereof can be matched with that of the other objective lens 43 with a simple configuration in which the objective lens adaptor 45 is merely interposed between the objective lens 43 and the mounting position 41b in the nosepiece 41.

By doing so, the length of one of the objective lenses 43 is adjusted so that the respective distances in the optical axis direction from the mounting positions 41b in the nose piece 41 for the two objective lenses 43 to the focal positions of the individual objective lenses 43 (the distances in the optical axis direction from the mounting positions 41b in the nosepiece 41 for the objective lenses 43 to the focal positions of the objective lenses 43 will be, hereinafter, referred to as "parfocal distances") are dimension E.

Next, as shown in FIG. 5, the objective lens unit 50 is formed of a nosepiece (mounting device) 51 that can be attached to the arm 15 of the microscope main unit 10 and an objective lens 53 that can be attached to and detached from the nosepiece 51. The nosepiece 51 has a nosepiece main unit (mounting device main unit) 55A on which the objective lens 53 is mounted and a mounting adaptor 55B that is fixed to the nosepiece main unit 55A and that attaches the nosepiece main unit 55A to the attachment position 15a in the arm 15 in an attachable/detachable manner.

The nosepiece main unit 55A can be rotated about a predetermined rotation axis (not shown) and a plurality of the objective lenses 53 can be simultaneously mounted thereon with spaces therebetween in the circumferential direction. In FIG. 5, one objective lens 53 is mounted on the nosepiece main unit 55A. This nosepiece 51 is configured such that, by rotating the nosepiece main unit 55A about the rotation axis, any one of the plurality of objective lenses 53 can be selectively placed at a position facing the specimen.

This nosepiece main unit 55A has a smaller thickness A than the thickness of the nosepiece 31 or the nosepiece 41. The mounting adaptor 55B has a thickness B corresponding to a difference between the thickness of the nosepiece main unit 55A and the thickness of the nosepiece 31 as well as that of the nosepiece 41. By doing so, distances from an attachment position 51a where the nosepiece 51 is attached to the arm 15 to mounting positions 51b where the objective lenses 53 are mounted on the nosepiece 51 are set to be dimension C. Therefore, by interposing the mounting adaptor 55B between the attachment position (mounting position) 15a in the arm 15 and the nosepiece main unit 55A, the nosepiece 51 compensates for size differences relative to the nosepieces 31 and 41, which are formed as single pieces.

The respective lengths of the plurality of objective lenses 53 mounted on the nosepiece 51 are set so that distances in the optical axis direction from the mounting positions 51b in the nosepiece 51 for the individual objective lenses 53 to focal positions of the individual objective lenses 53 (the distances in the optical axis direction from the mounting positions 51b in the nosepiece 51 for the objective lenses 53 to the focal positions of the objective lenses 53 will be, hereinafter, referred to as "parfocal distances") are dimension E.

These patch-clamping or in-vivo objective lens units 30, 40, and 50 can also be moved in the optical axis direction (Z direction) of the individual objective lenses 33, 43, and 53 through the up-down movement of the arm 15. In addition, the objective lens units 30, 40, and 50 are also compatible with differential interference contrast observation, and, as with the revolver 21, the individual nosepieces 31, 41, and 51 are provided with the DIC slider 1 in an attachable/detachable manner.

In all of the above-described objective lens units 20, 30, 40, and 50, distances in the optical axis direction from the respective attachment positions 21a, 31a, 41a, and 51a where the revolver 21 or nosepieces 31, 41, and 51 are attached to the arm 15 of the microscope main unit 10 to the focal positions of the individual objective lenses 23, 33, 43 and 53, that is, distances in the optical axis direction from the attachment position 15a in the arm 15 to the focal positions of the individual objective lenses 23 33, 43, and 53, are set to be the same dimension (dimension C +dimension E).

Next, the effects of the thus-configured microscope system 100 will be described.

Figure 6:
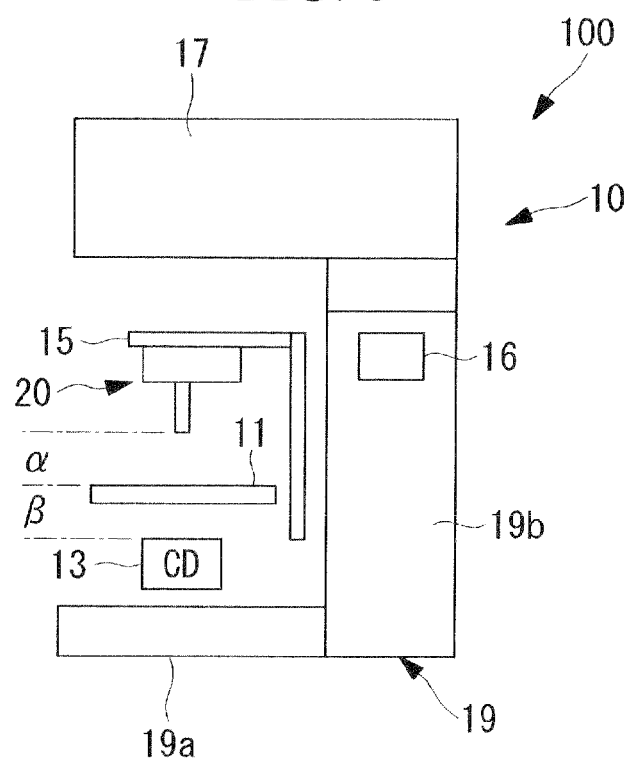
FIG. 6 is a schematic configuration diagram showing a case in which a specimen is observed by attaching the imaging objective lens unit to a microscope main unit.

In the case in which a specimen, such as cells or the like, held on a slide glass or in a dish is observed with the microscope system 100 according to this embodiment by employing the imaging objective lens unit 20, as shown in FIG. 6, the height-increasing member 18 is removed and the condenser 13 is placed above the base portion 19a of the frame 19 without using the condenser holder 14.

In addition, the height of the stage 11 is set so that the distance between the stage 11 and the condenser 13 is $\beta$. Furthermore, the objective lens unit 20 is attached to the microscope main unit 10, and one of the objective lenses 23 is placed directly above the specimen by means of the revolver 21. The distance from the tip of the objective lens 23 to the stage 11 when the arm 15 is at the reference position is defined as $\alpha$.

In this state, illumination light is generated at the light source for transmission illumination, and the illumination light is radiated onto the specimen with the condenser 13. By radiating the illumination light from below the stage 11, transmission light (detection light) that passes through the specimen is collected by the objective lens 23 and is detected by the detection unit. By doing so, the specimen can be observed.

In this case, because the distances in the optical axis direction from the mounting positions 21b in the revolver 21 for the plurality of objective lenses 23 mounted on the objective lens unit 20 to their focal positions are set to be equal, within the objective lens unit 20, an objective lens 23 can be easily switched to another objective lens 23 having a different magnification while keeping the same parfocal distance.

Figure 7:
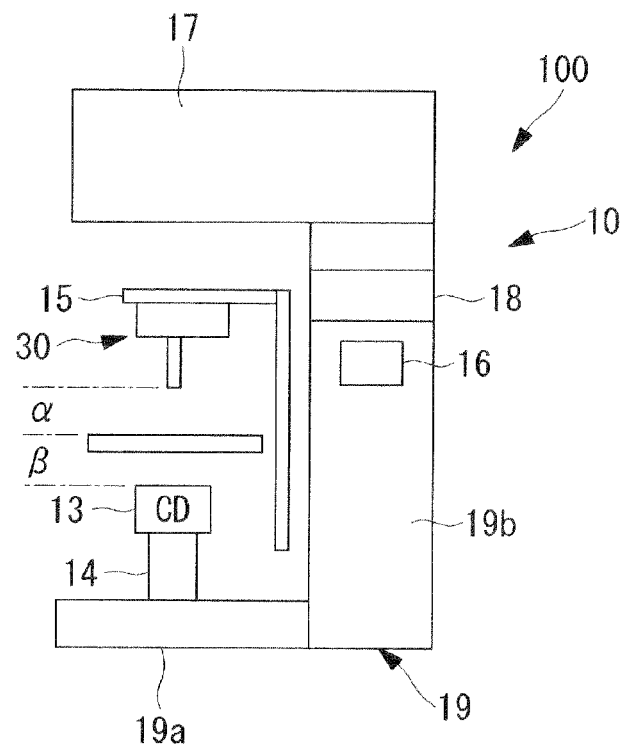
FIG. 7 is a schematic configuration diagram showing a case in which a specimen is observed by attaching the patch-clamping or in-vivo objective lens unit.

Next, in the case in which a specimen, such as cells or the like, held on a slide glass or in a dish is observed by exchanging the imaging objective lens unit 20 with the patch-clamping or the in-vivo objective lens unit 30, 40, or 50, as shown in FIG. 7, the height-increasing member 18 is mounted thereon to increase the height of the reference position of the arm 15 and the illuminator 17. In addition, the condenser holder 14 is provided on the base portion 19a of the frame 19 to support the condenser 13 with the condenser holder 14. Additionally, the height of the stage 11 is set so that the distance between the stage 11 and the condenser 13 is $\beta$.

For example, assuming that the objective lens unit 30 is employed, the arm 15 is moved away from the stage 11, the objective lens unit 20 is removed, and the objective lens unit 30 is attached to the arm 15. Then, one of the objective lenses 33 is placed directly above the specimen by means of the nosepiece 31. By increasing the height of the arm 15 by mounting the height-increasing member 18, the distance from the tip of the objective lens 33 to the stage 11 when the arm 15 is at the reference position is $\alpha$, even though the condenser holder 14 is provided.

In this case, because the distances in the optical axis direction from the attachment position 21a where the revolver 21 is attached to the arm 15 to the focal positions of the objective lenses 23 and the distances in the optical axis direction from the attachment position 31a where the nosepiece 31 is attached to the arm 15 to the focal positions of the objective lenses 33 are set to be equal, even if the objective lens unit 20 is moved in the optical axis direction with the raising mechanism 16 in order to ensure sufficient space when exchanging the objective lens units 20 and 30, the parfocal distance for the objective lens unit 20 before exchange and the parfocal distance for the objective lens unit 30 after exchange can be maintained in a simple manner.

In the state in which one of the objective lenses 33 is placed directly above the specimen, the illumination light is generated at the light source for transmission illumination, the illumination light is radiated onto the specimen with the condenser 13, and transmission light that passes through the specimen is collected by the objective lens 33 to be detected by the detection unit. By doing so, the specimen can be observed. Although the case in which the objective lens unit 30 is employed is described as an example, the operation is the same for the case in which the objective lens unit 40 or 50 is employed.

In addition, because the distances in the optical axis direction from the mounting positions 31b in the nosepiece 31 for the plurality of objective lenses 33 mounted on the objective lens unit 30 to their focal positions are also set to be equal in the objective lens unit 30, within the objective lens unit 30, an objective lens 33 can be easily switched to another objective lens 33 having a different magnification while keeping the same parfocal distance.

Figure 8:
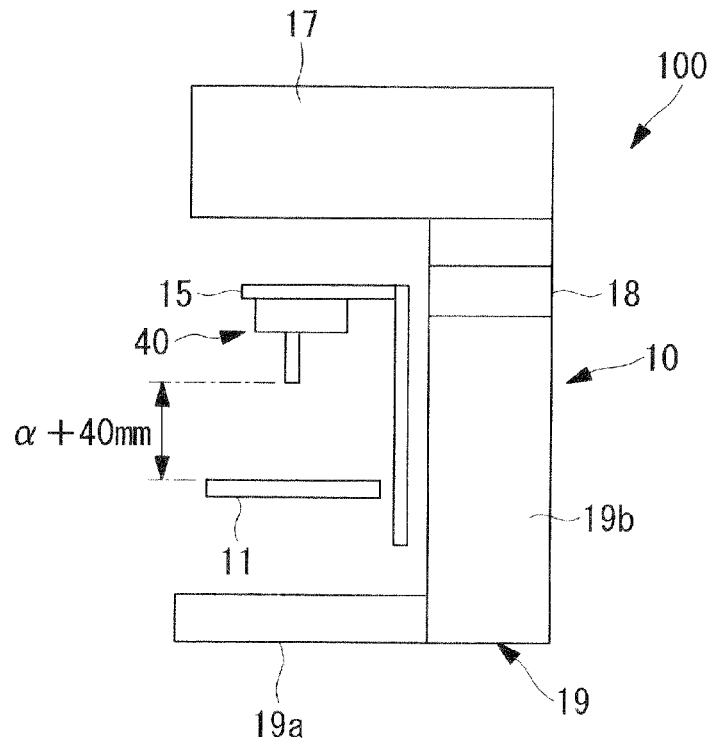
FIG. 8 is a schematic configuration diagram showing a case in which a specimen is observed by attaching another patch-clamping or in-vivo objective lens unit.

Next, in the case in which a small animal whose size is comparatively small is observed as a specimen instead of a specimen such as cells or the like held on a slide glass or in a dish by employing the patch-clamping or the in-vivo objective lens unit 30, 40, or 50, as shown in FIG. 8, the condenser holder 14 and the condenser 13 are removed from the base portion 19a of the frame 19 while leaving the height-increasing member 18 mounted in place.

Then, for example, assuming that the objective lens unit 40 is employed instead of the objective lens unit 30, the arm 15 is moved away from the stage 11, the objective lens unit 30 is removed, and the objective lens unit 40 is attached to the arm 15. One of the objective lenses 43 is placed directly above the specimen by means of the nosepiece 41. In order to ensure sufficient space between the stage 11 and the objective lens 43 in accordance with the size of the specimen, the height of the stage 11 is set so that the distance between the stage 11 and the tip of the objective lens 43 is, for example, $\alpha$+40 mm.

Because the distances in the optical axis direction from the attachment position 31a where the nosepiece 31 is attached to the arm 15 to the focal positions of the objective lenses 33 and the distances in the optical axis direction from the attachment position 41a where the nosepiece 41 is attached to the arm 15 to the focal positions of the objective lenses 43 are similarly set to be equal in this case, the parfocal distance for the objective lens unit 30 before exchange and the parfocal distance for the objective lens unit 40 after exchange can be maintained in a simple manner.

In the state in which one of the objective lenses 43 is placed directly above the specimen, illumination light is generated at the light source for incident-light illumination, and the illumination light is radiated onto the specimen with the objective lens 43 via the illumination optical system in the illuminator 17. Returning light (detection light) that returns from the specimen by irradiating it with the illumination light is collected by the objective lens 43 to be detected by the detection unit. By doing so, the specimen can be observed. Although the case in which the objective lens unit 40 is employed is described as an example, the operation is the same for the case in which the objective lens unit 30 or 50 is employed.

In addition, because the distances in the optical axis direction from the mounting positions 41b in the nosepiece 41 for the plurality of objective lenses 43 mounted on the objective lens unit 40 to their focal positions are also set to be equal in the objective lens unit 40, within the objective lens unit 40, an objective lens 43 can be easily switched to another objective lens 43 having a different magnification while keeping the same parfocal distance.

Figure 9:
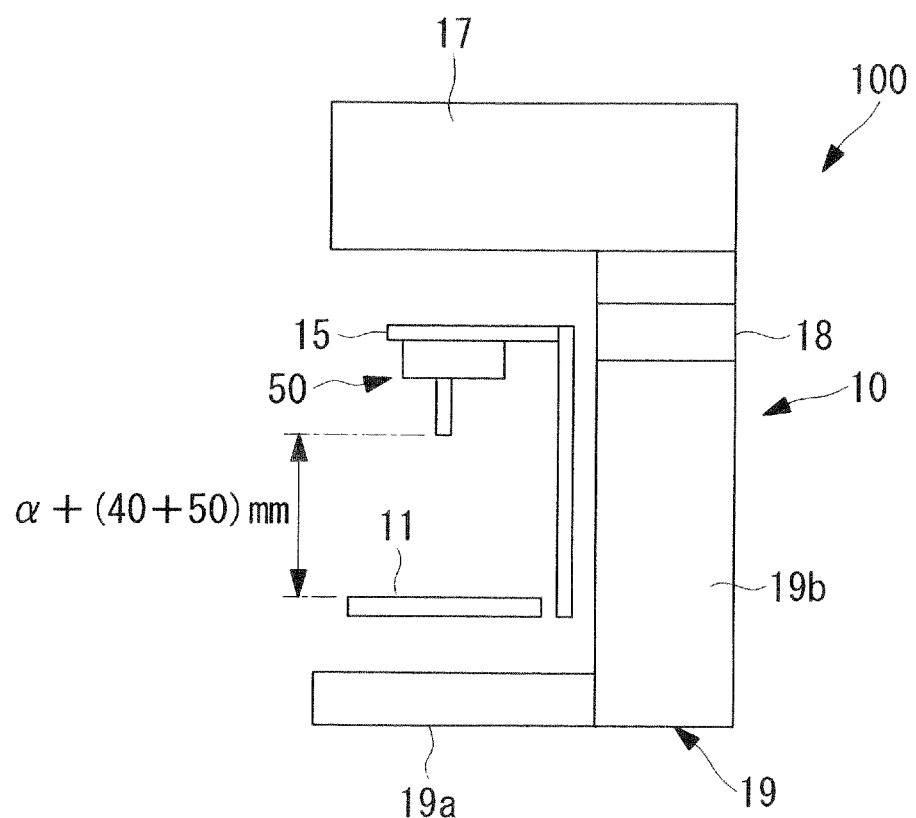
FIG. 9 is a schematic configuration diagram showing a case in which a specimen is observed by attaching another patch-clamping or in-vivo objective lens unit.

Next, in the case in which a small animal whose size is comparatively large is observed as a specimen instead of a small animal whose size is comparatively small by employing the patch-clamping or the in-vivo objective lens unit 30, 40, or 50, as shown in FIG. 9, the height-increasing member 18 is left mounted in place, the condenser holder 14 and the condenser 13 are left removed, and the height of the stage 11 is lowered in accordance with the size of the specimen.

For example, assuming that the objective lens unit 50 is employed to as to exchange the objective lens unit 40, the arm 15 is moved away from the stage 11, the objective lens unit 40 is removed, and the objective lens unit 50 is attached to the arm 15. Then, one of the objective lenses 53 is placed directly above the specimen by means of the nosepiece 51. In order to ensure sufficient space between the stage 11 and the objective lens 53 in accordance with the size of the specimen, the height of the stage 11 is set so that the distance between the stage 11 and the tip of the objective lens 53 is $\alpha+(40+50)$ mm.

Because the distances in the optical axis direction from the attachment position 41a where the nosepiece 41 is attached to the arm 15 to the focal positions of the objective lenses 43 and the distances in the optical axis direction from the attachment position 51a where the nosepiece 51 is attached the arm 15 to the focal positions of the objective lenses 53 are also set to be equal in this case, the parfocal distance for the objective lens unit 40 before exchange and the parfocal distance for the objective lens unit 50 after exchange can be maintained in a simple manner.

In the state in which one of the objective lenses 53 is placed directly above the specimen, the illumination light is generated at the light source for incident-light illumination to be radiated onto the specimen with the objective lens 53 via the illumination optical system in the illuminator 17, and returning light that returns from the specimen is collected by the objective lens 53 to be detected by the detection unit. By doing so, the specimen can be observed. Although the case in which the objective lens unit 50 is employed is described as an example, the operation is the same for the case in which the objective lens unit 30 or 40 is employed.

In addition, because the distances in the optical axis direction from the mounting positions 51b in the nosepiece 51 for the plurality of objective lenses 53 mounted on the objective lens unit 50 to their focal positions are also set to be equal in the objective lens unit 50, within the objective lens unit 50, an objective lens 53 can be easily switched to another objective lens 53 having a different magnification while keeping the same parfocal distance.

As has been described above, with the microscope system 100 according to this embodiment, by setting the distances in the optical axis direction from the respective attachment positions 21a, 31a, 41a and 51a where the revolver 21 or the nosepieces 31, 41, and 51 are attached to the microscope main unit 10 to the focal positions of the individual objective lenses 23, 33, 43, and 53 to be mutually equal among the objective lens units 20, 30, 40, and 50, the parfocal distance for the objective lens unit 20, 30, 40, or 50 before exchange and the parfocal distance for the objective lens unit 20, 30, 40, or 50 after exchange can be maintained in a simple manner when exchanging the objective lens units 20, 30, 40, and 50, even though the objective lens unit 20, 30, 40, or 50 is moved in the optical axis direction with the raising mechanism 16 in order to ensure sufficient space. Therefore, while maintaining the parfocal distances for the objective lenses 23, 33, 43, and 53 among the plurality of objective lens units 20, 30, 40, and 50, these objective lens units 20, 30, 40, and 50 can be employed by selectively exchanging them.

Although the objective lens 43 is provided with the objective lens adaptor 45 in this embodiment, the other objective lens 23, 33, or 53 may be provided with the objective lens adaptor, and thereby, the lengths thereof may be adjusted so that the parfocal distances of the plurality of objective lenses 23, 33, or 53 in the same objective lens unit 20, 30, or 50 are matched.

In addition, although the nosepiece 51 of the objective lens unit 50 is provided with the mounting adaptor 55 in this embodiment, one of the revolver 21 of the objective lens unit 20, the nosepiece 31 of the objective lens unit 30, and the nosepiece 41 of the objective lens unit 40 may be provided with the mounting adaptor.

REFERENCE SIGNS LIST 10 microscope main unit
20, 30, 40, 50 objective lens unit
21 revolver (mounting device)
21a attachment position
23 objective lens
31 nosepiece (mounting device)
31a attachment position
33 objective lens
41 nosepiece (mounting device)
41a attachment position
43 objective lens
51 nosepiece (mounting device)
51a attachment position
53 objective lens
55B mounting adapter
100 microscope system

The invention claimed is:
1. A microscope system comprising:
a microscope main unit that generates illumination light to be radiated onto a specimen and that detects detection light from the specimen; and
a plurality of attachable/detachable objective lens units that are selectively attached to the microscope main unit,
wherein the microscope main unit includes a raining mechanism that can move an attached one of the plurality of objective lens units in an optical axis direction,
wherein each of the plurality of objective lens units includes a mounting device that is attachable to the microscope main unit and plurality of objective lenses each of which is mounted on the mounting device in an attachable/detachable manner, and each of which collects the detection light from the specimen;
wherein the plurality of objective lens units comprise:
a first objective lens unit which includes a first mounting device and with which one of a plurality of first objective lenses is selectively placeable in an optical path of the illumination light by swinging the plurality of first objective lenses attached to a swing unit that is capable of swinging about a swing axis in a direction perpendicular to an optical axis or by sliding the plurality of first objective lenses mounted on the first mounting device in a direction perpendicular to the optical axis, and a second objective lens unit which includes a second mounting device and with which one of a plurality of second objective lenses is selectively placeable in the optical path of the illumination light by rotating the plurality of second objective lenses mounted on the second mounting device about a predetermined rotation axis;

wherein the first objective lens unit and the second objective lens unit are selectively attachable to the microscope main unit;

wherein the second objective lens unit is attachable to the microscope main unit via a mounting adaptor that is fixed to a main body of the second mounting device when the second objective lens unit is attached to the microscope main unit;

wherein a distance from a mounting position of the first objective lens unit at a side of the microscope main unit to a focal position of one of the first objective lenses that is attached to the first objective lens unit and that is placed in the optical path of the illumination light and a distance from a mounting position of the second objective lens unit to a focal position of one of the second objective lenses that is attached to the second objective lens unit and that is placed in the optical path of the illumination light are set to be mutually equal;

wherein a dimension of the first mounting device in the optical axis direction from a microscope main unit side mounting position thereof to a first objective lens side mounting position is different from a dimension of the second mounting device in the optical axis direction from an adaptor side fixing position thereof to a second objective lens side mounting position, wherein the microscope main unit comprises a illuminator having an illumination optical system on an inside thereof, and a frame unit comprising the raising mechanism, wherein the frame unit includes a base portion provided in a horizontal direction and a body potion formed perpendicular to the base portion, and wherein the microscope system further comprises a height-increasing member which has a predetermined thickness and which is provided in an attachable/detachable manner between the illuminator and a top end of the body portion of the frame unit such that the height-increasing member adjusts a height of the illuminator.

2. A microscope system according to claim 1, wherein at least one of the plurality of first objective lenses in the first objective lens unit is mountable to the first mounting device via an objective lens adaptor disposed between a mounting position in the first mounting device and the at least one of the plurality of first objective lenses, such that distances from mounting positions in the first mounting device for the plurality of first objective lenses to focal positions of the plurality of first objective lenses are set to be equal to each other.

3. A microscope system according to claim 2, wherein the microscope main unit further comprises an arm unit to which one of the plurality of objective lens units is attached.

4. A microscope system according to claim 1, wherein the microscope main unit further comprises an arm unit to which of the plurality of objective lens units is attached.

* * * * *